Aug. 27, 1963  G. H. BINGHAM, JR., ETAL  3,101,496
METHOD OF MAKING FOOTWEAR HAVING WATER-IMPERVIOUS OUTER SOLES
Filed May 12, 1961  3 Sheets-Sheet 1
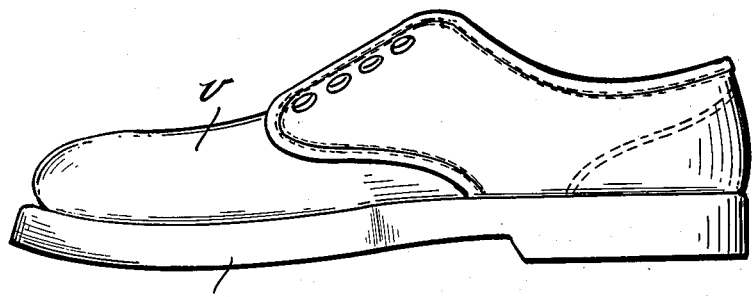
FIG. 1
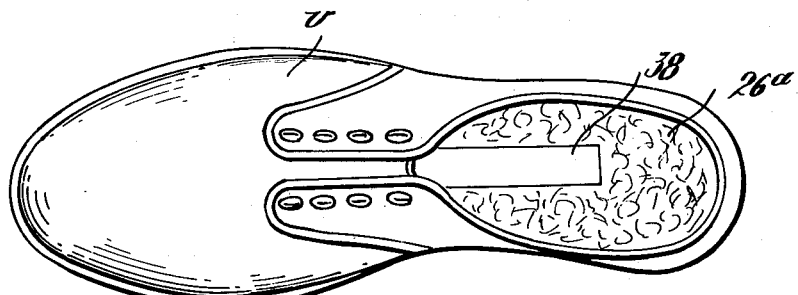
FIG. 2
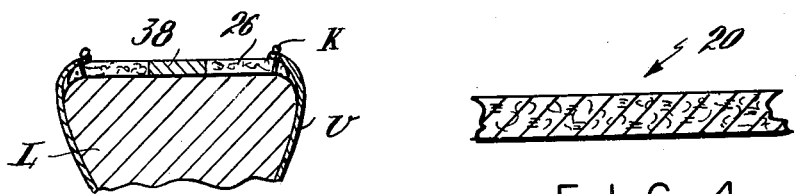
FIG. 3  FIG. 4
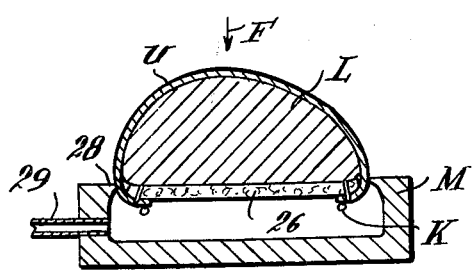
FIG. 5
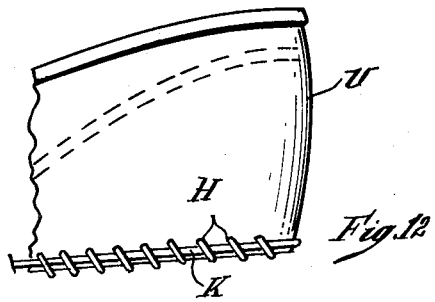
INVENTORS
GEORGE H. BINGHAM, JR.
OTTO Y. OLSSON
BY
ATTORNEYS Aug. 27, 1963   G. H. BINGHAM, JR., ETAL   3,101,496
METHOD OF MAKING FOOTWEAR HAVING WATER-IMPERVIOUS OUTER SOLES
Filed May 12, 1961   3 Sheets-Sheet 2

INVENTORS
GEORGE H. BINGHAM, JR.
OTTO Y. OLSSON
BY
ATTORNEYS

Aug. 27, 1963     G. H. BINGHAM, JR., ETAL     3,101,496
METHOD OF MAKING FOOTWEAR HAVING WATER-IMPERVIOUS OUTER SOLES
Filed May 12, 1961     3 Sheets-Sheet 3

INVENTORS
GEORGE H. BINGHAM, JR.
OTTO Y. OLSSON

BY

ATT'YS 3,101,496
METHOD OF MAKING FOOTWEAR HAVING WATER-IMPERVIOUS OUTER SOLES
George H. Bingham, Jr., Westminster, and Otto Y. Olsson, Taneytown, Md., assignors to Cambridge Rubber Company, Taneytown, Md., a corporation of Maryland
Filed May 12, 1961, Ser. No. 109,656
4 Claims. (Cl. 12—142)

This invention pertains to footwear, more particularly to a boot or shoe whose outer sole is of waterproof material, and whose upper may be of any appropriate material, whether waterproof or not, depending upon its intended use. When herein the term "plastic" is employed in referring to the material of the outer sole, this term is to be construed broadly as inclusive, not only of synthetic plastics but also of rubber compounds or other materials capable of being molded to shape and especially those which may be shaped by injection molding methods, and which, prior to complete curing or fusing, are in flowable condition, but which are shape retaining when completely fused or cured. Furthermore the terms "boot" and "shoe," as herein employed, are intended to include footwear designed to be worn over the unshod foot as well as such as is intended to be worn over an ordinary shoe or slipper.

The invention relates more especially to improvements in the construction and/or method of manufacturing such a boot or shoe, so as to provide a boot or shoe which is lighter in weight than one, made by customary methods, having a waterproof outer sole of the same apparent thickness; to provide a boot or shoe having a bottom structure such that the boot or shoe may be washed without danger of saturating the bottom structure of the shoe with water; to provide a boot or shoe which is shape-retaining and long wearing; which comprises an insulating insole, and which insures foot comfort and support.

It has become common practice to subject fabric footwear, casual footwear, sneakers and so forth, to submersion in washing machines or to some other cleaning treatment, but when a shoe of ordinary construction, having a waterproof outer sole, is so treated, and the usual inner elements of the bottom structure become saturated with water, it is very difficult to dry the shoe because the impervious outer sole forms a barrier to the passage of air or moisture.

The purchasing public has become accustomed to waterproof outer soles for footwear, for example, rubber outer soles, of a substantial apparent thickness, but an outer sole of solid rubber or plastic of the customary apparent thickness is heavy and fatiguing to the wearer. However, because of improvements in waterproof materials available for outer soles, the usual thick outer sole often long outwears the upper of the shoe, so that outsoles of conventional thickness are no longer necessary.

Moreover, since rubber and similar waterproof materials readily conduct heat, shoes having such outer soles are often uncomfortably cold, and because of the resiliency of such materials, they fail to provide the firm support for the foot necessary to avoid undue fatigue.

Among the objects of the present invention are to provide a shoe having a waterproof outer sole but which may be subjected to any usual laundering treatment without danger of absorbing water into the bottom structure; to provide a shoe having a waterproof outer sole which, in external appearance is of customary thickness, but wherein the shoe is lighter in weight than one having a solid rubber or plastic outer sole of usual thickness. A further object is to provide a shoe having a waterproof outer sole which is so insulated as to make the shoe comfortable when worn in cold weather; to provide a shoe which is long wearing; and to provide a shoe which, while flexible, nevertheless provides a rigid support for the sole of the wearer's foot.

A further object of the invention is to provide a novel shoe construction and a method whereby a sole element, such as a midsole or insole, after assembly with an upper upon a last, is bonded by portions of the outer sole material to the lasting margin of the upper. A further object is to provide a novel shoe and method of making it, wherein a water-impervious midsole is bonded to the lasting margin of the upper as a concomitant to the attachment of the outer sole to said lasting margin and wherein an insole may, at the same time, be bonded to the midsole by portions of the outer sole material which protrude upwardly above the midsole.

In the attainment of certain of said objects the present invention involves the employment of a sole element (disposed between the upper surface of the outer sole and the wearer's foot) which is of a material which when incorporated in the shoe is non-absorbent of moisture; which is heat-insulating; provides a smooth and flat foot-supporting surface; and which is so firmly bonded to the material of the outer sole as well as to the shoe upper as to provide, in substance, a unitary structure insuring long wear and firm support for the foot, but without substantial loss of flexibility. Further, in the attainment of the above objects, the invention contemplates the employment of a sole element, either as a true insole, or as a slip sole (or alternatively a midsole interposed between the outer sole and an overlying sole element) consisting of sheeted material, for example, fibers, whether natural or synthetic, including the usual textile fibers (whether or not of a felting character) or combinations thereof, from which the sole element may be cut by the employment of a die. Such a material is substantially lighter in weight than solid rubber or plastic and may be made as thick as desired, so as to occupy a substantial part of the space which would otherwise be filled by the outer sole material, but which is so incorporated in the shoe bottom that the outer sole, in the completed shoe, as viewed from the outside, is of an apparent thickness like that of the solid, waterproof outer soles, which are customarily used. In accordance with the present invention, the sheet material (or the individual sole element) is preferably so treated, prior to its incorporation in the shoe, with a suitable medium as to waterproof the individual fibers, and at the same time, reinforce them, but is preferably so applied that it does not completely fill all of the interstices between the constituent fibers; for instance, so that at least 25% of such interstices are left unfilled. However, in the practice of the present invention, the remaining voids between the fibers are substantially filled. Alternatively, the material from which said sole element is made, may be made completely impervious initially to the passage of fluid but, in that instance, the sole element will be provided (preferably in die-cutting the sole element from the sheet material) with perforations at selected points, for example, at the forepart and/or at the heel portion.

Some of the above objects are attainable, in the practice of the invention, as applied to the manufacture of shoes in which the outer sole, of partially cured rubber or plastic, is die-cut from sheet material and then is bonded, as a unit, to the bottom of the lasted upper. However, the full attainment of the above objects, accompanied with low cost construction, is found in the concomitant forming and attachment of the outersole to the bottom of the lasted upper by recourse to injection molding in which the material of the outer sole is forced into a mold cavity in liquid form and under pressure.

When the shoe is to be slip-lasted, and a slip sole is to be used, the invention contemplates the provision of a specially formed last having its bottom so shaped as to provide a very narrow rim or rib extending about its periphery and of a height substantially equally the thickness of the insole or slip sole. Into the recess or chamber between the last bottom and midsole, and which is bounded by this rib or rim the slip sole may be inserted after the upper has been lasted. A last so devised, also facilitates the positioning of an insole in assembling the parts preparatory to lasting.

Other and further objects of this invention will be pointed out in the following more detailed description and by reference to the accompanying drawings, wherein FIG. 1 is a side elevation of a shoe of a type such as may be made in accordance with the present invention;

FIG. 2 is a plan view of the shoe of FIG. 1;

FIG. 3 is a fragmentary transverse vertical section, showing a lasted shoe according to the present invention;

FIG. 4 is a fragmentary vertical section, to larger scale than FIG. 3, showing material useful in the preparation of a sole element for use in accordance with the present invention;

FIG. 5 is a diagrammatic vertical section, transversely of a lasted shoe upper, illustrative of one desirable device for use in providing the lasted upper with an outer sole;

Figures 8, 9:
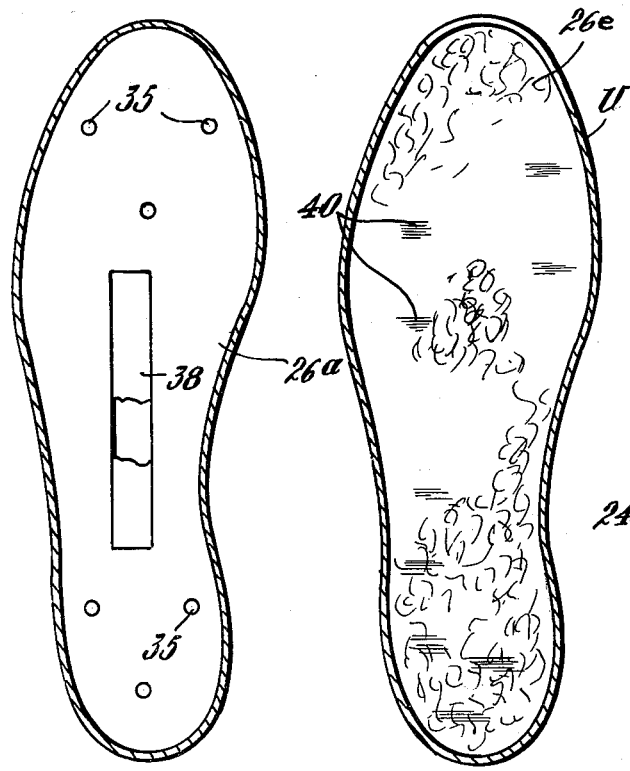
Figure 10:
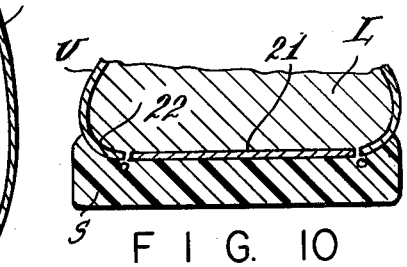
Figure 11:
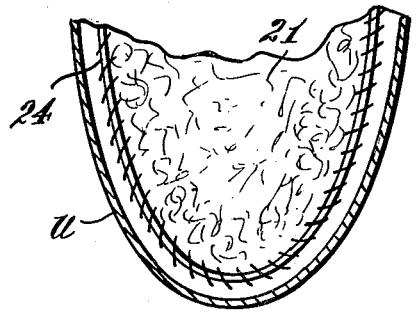
Figure 13:
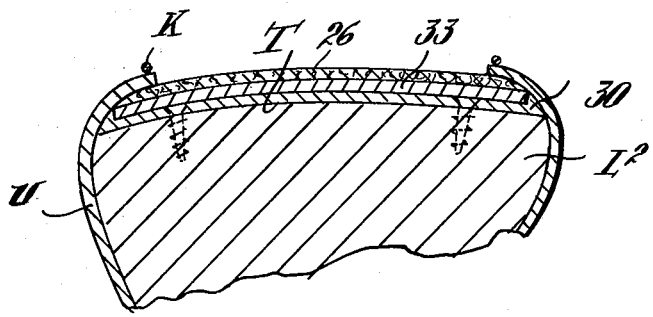
Figures 14, 15:
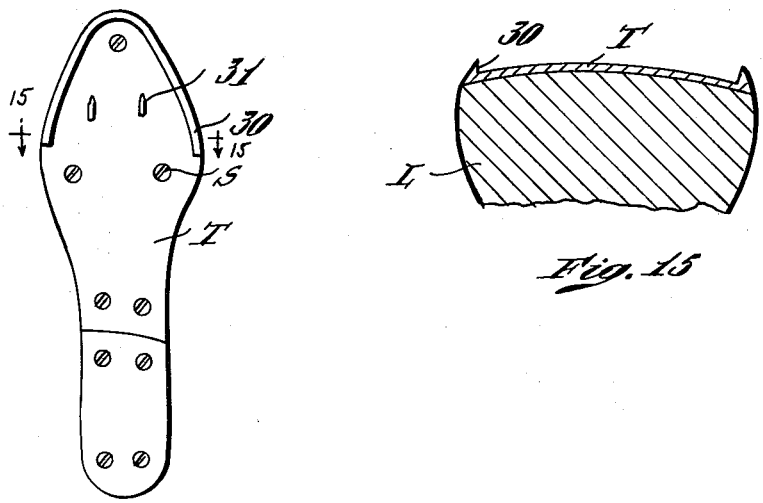

FIG. 8 is a plan view of a shoe made in accordance with the present invention, with the upper cut away in a plane just above the upper surface of the midsole, showing the midsole as having a shank stiffener of relatively hard material embedded in the substance of the midsole, the latter having small openings for the express purpose of permitting some of the outer sole material to protrude upwardly through the midsole to provide a bond for an inner sole element, not shown in FIG. 8;

FIG. 9 is a view similar to FIG. 8, but showing a shoe having a midsole (no insole element being shown) which is pervious to the outer sole material while the latter is in fluent condition, so that portions of the outer sole material penetrate the substance of the midsole and provide for bonding it (and an inner sole if the latter were used) to the shoe upper during the attachment of the outer sole;

FIG. 10 is a fragmentary transverse section through a lasted shoe upper showing an insole applied directly to the last bottom and a preformed outer sole which has been so treated that it is firmly bonded to the lasted-in margin of the upper and to the insole;

FIG. 11 is a fragmentary horizontal section through the toe end of a shoe, the section being just above the upper surface of the midsole, and showing that the margin of the upper has been lasted in by the string method of lasting;

FIG. 12 is a fragmentary side elevation of a shoe upper, illustrating a preferred ararngement of a lasting cord for use in string-lasting the shoe;

FIG. 13 is a fragmentary transverse vertical section illustrating a lasted shoe comprising an upper, midsole and slip sole and showing a last of special construction such as to facilitate the introduction of a slip sole;

FIG. 14 is a bottom view, to smaller scale, of the last shown in FIG. 12; and

FIG. 15 is a section the line 15—15 of FIG. 14.

Referring to the drawings and, in particular, to FIG. 4, the numeral 20 designates a piece of sheeted material which may hereafter be referred to for convenience as "felt," and which may, for example, as above suggested, consist of fibrous materials, whether of a felting character or not, so bound together as to form a sheet of substantially uniform and desired thickness. When the material is to be used merely as a moisture barrier, the thickness of this material, when ready for incorporation in the shoe may, for example, be of the order of one-sixteenth of an inch, whereas, when it is to be used as a midsole and intentionally to occupy some of the space which would normally be filled with the outer sole material, its thickness may be substantially greater, for example from one-eighth to one-quarter of an inch in thickness.

Either before or after the desired sole element is die-cut from this material, the material is treated with a liquid which waterproofs individual fibers and which also usually concomitantly strengthens the fibers. Treatment with a liquid vinyl plastic gives good results. However, it is desirable, in the practice of the present invention, that this waterproofing of the individual fibers shall not be accompanied by a complete filling of the interfiber spaces, it being desirable to leave at least as much as 25% of the original interfiber spaces unfilled. With this particular object in view, it is contemplated that it may be desirable to treat the individual fibers to make them moisture-proof before they are assembled to form the sheet material indicated in FIG. 4.

In accordance with one procedure, wherein the material 20 is employed primarily to provide a smooth and firm support for the wearer's foot, and wherein the outer sole is die-cut from a sheet of partially cured material preparatory to its assembly with the upper, a foot-supporting sole element made of the sheet material 20 of FIG. 4, is die-cut to the proper dimensions, this sole element 21 (FIGS. 10 and 11), in that case, being relatively thin and of such size that, when the lower margin 22 of the shoe upper U is lasted-in, the upper surface of the sole element 21 will be substantially flush with the inturned marginal portion of the upper.

In the making of the shoe, in accordance with this procedure, the sole element 21 is desirably secured to the bottom of the last in usual fashion and the upper is drawn over the last, and as here disclosed in FIGS. 10 and 11, the margin 22 of the upper is string-lasted, so that its inner edge is drawn in close to the edge of the sole element 21. Having prepared an outer sole blank, this is placed in a mold in a machine of customary type, and the lasted upper, with its assembled insole element 21, is forced down into the mold and onto the upper surface of the sole blank and, while the parts are held under compression, the material of the sole blank is completely cured. In this manner, the material of the outsole becomes integrally bonded to the lower marginal portion of the upper and also to the sole element 21 and, by reason of the pressure to which the parts are subjected, some of the sole material is forced into the interstices of the sole element and embeds the lasting cord, thus providing a unitary bottom structure which is impervious to and non-absorbent of water, both internally and externally. Then such a shoe may be laundered and dried without difficulty. Moreover, it provides a smooth, level foot-supporting surface.

In FIG. 3 there is shown a midsole 26 which may be made of the material 20 shown in FIG. 4 but which is substantially thicker than the sole element 21 above described. Thus, in the completed shoe, it acts to some extent to cushion the foot and occupies substantial space, so that the requisite amount of outer sole material is less than usual. This midsole 26 is assembled with the shoe upper on the last L, and the margin of the upper U is then lasted-in over the midsole 26 in any desired manner, but, as here illustrated, by string-lasting. Preferably, the string or cord K (FIG. 12) employed for this purpose is so attached to the margin of the upper by the stitches H that it is at the outer surface of the upper, so that when the upper is lasted, this cord K lies exposed at the under side of the lasted margin. The lasted upper with the assembled midsole member 26 is then fitted down into a mold M (FIG. 5) having a marginal edge 28 which fits snugly against the outer surface of the shoe upper. Outer sole material, in fluid form, is then injected, under pressure, through the nipple 29, into the mold cavity, and forces itself up into the interfiber spaces of the midsole; into any crevices between the midsole and lasting margin; about the lasting cord K, and up around the lower portion of the upper as far as permitted by the edges 28 of the mold, thus providing an integrated bottom structure.

Because of the presence of the thick midsole 26, the amount of outsole material employed is less than usual in a shoe having an outsole of the same apparent thickness, and because of this the shoe is unusually light in weight. As previously suggested, it is contemplated that, if desired, a slip sole may be introduced after the completion of lasting or after the shoe, as a whole is otherwise completed. It is further contemplated that a slip sole may be mounted on the last bottom before the application of the midsole.

With this possibility in view, the present invention contemplates the provision of a specially designed last $L^2$ (FIG. 13), having its botttom so reduced as to leave a marginal rib 30, this rib being narrow transversely and of a height substantially equal to the thickness of the desired slip sole. The rib 30 provides a confining barrier within which the slip sole 33 may be positioned. As here illustrated, this rib 30 is formed on a metal bottom plate T, attached to the wood last by screws S. If desired, in order to position the slip sole during the lasting operation, the bottom of the last, desirably at its forepart, may be provided with projecting pins 31 (FIG. 14), for engagement with the slip sole. FIG. 13 shows the last $L^2$ with its peripheral rib 30, the slip sole 32 and a midsole 26, with the margin of the upper U, lasted over the midsole. Such an assembly may be provided with an outer sole in the manner above described by the use of a mold M with provision for the injection of outer sole material in plastic-fluid condition.

Figure 6:
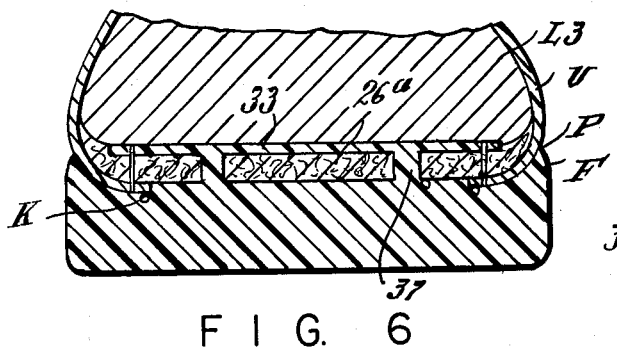
FIG. 6 is a fragmentary transverse section through a lasted shoe upper, wherein the shoe comprises a midsole, an outer sole of moldable material, and an inner sole element overlying the midsole and bonded to the midsole and upper by portions of the outer sole material protruding upwardly through the midsole.

In FIG. 6 there is shown a last $L^3$ having assembled therewith the shoe upper U, an insole or slip sole 33 and a midsole 26a, the margin of the upper being shown as having been lasted-in by the use of a lasting cord K. In this particular arrangement, it may be assumed that the material of the midsole 26a has been made completely impervious to fluid, but in order to provide for its bonding to the material of the outer sole, and also to provide for the bonding of the inner sole to the other parts, the midsole has been provided with a plurality of openings 35 (FIG. 8), some of them at the forepart and others at the heel portion, as here shown by way of example, so that portions 37 (FIG. 6) of the outer sole material may pass upwardly, during the molding operation, through these openings, so as to make bonding contact, both with the walls of the openings and also with the insole 33, thus joining the bottom elements of the shoe firmly together. As may be noted from inspection of FIG. 6, the thickness of the midsole 26a represents a substantial reduction in the volume of outer sole material which must be employed, although the apparent thickness of the outer sole is represented by the distance between the character P (FIG. 6) and the plane of the bottom of the outer sole, the upstanding marginal portion F of the outer sole constituting, in effect, a foxing strip.

In FIG. 8, the midsole 26a is shown as provided with a longitudinally extending shank stiffening element 38. This may be provided by cutting a suitable slot or groove in the midsole 26a and then fitting into this slot or groove a preformed elongate block or bar of a material harder, stiffer and stronger than the midsole material itself, and which during the molding operation, becomes permanently bonded to the material of the midsole proper, by the fluid material which forms the outer sole, as the latter is injected into the mold under high pressure.

Figure 7:
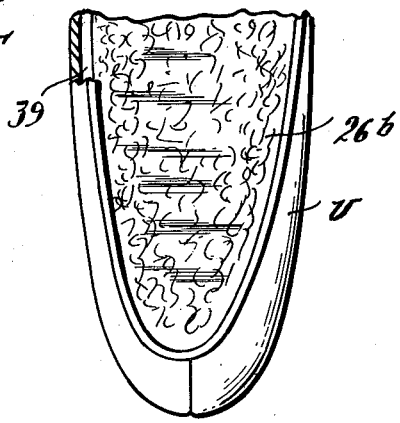
FIG. 7 is a fragmentary plan view illustrating the rear end of a shoe made in accordance with the present invention, but wherein the upper and the midsole have been permanently bonded by portions of the outer sole material, but without the incorporation of an insole.

In FIG. 7 there is shown a shoe having an upper U and a midsole 26b of material, such as above described, which is substantially impervious to the fluid outer sole material, but wherein, under the pressure to which it was subjected during the outer sole molding operation, some of the fluid material has protruded up between the edge of the midsole and the lasted-in margin of the upper to form a bordering strip 39 of the outer sole material visible at the interior of the shoe along the margin of the midsole. This outer sole material, at this point, forms a very firm bond between the midsole and the shoe upper. If of objectionable color, it may be concealed by the introduction of a slip sole.

FIG. 9 illustrates a midsole 26e whose material was so permeable to the liquid outer sole material that portions of the latter, indicated at 40, have passed upwardly and completely through the midsole, so as to appear as discoloring spots or areas upon the upper surface. Such a situation insures a very strong and firm bond between the outer sole and the midsole. If the outer sole material be of a light color, or translucent, these areas 40 may not be objectionable. On the other hand, if they are objectionable, they may be concealed by the employment of a suitable slip sole.

In general resumé of the subject matter herein disclosed, it may be noted that the felt material, employed in making the midsole or moisture barrier, may be from one-eighth to one-fourth inch in thickness, and after die-cutting, or while still in the yard goods, is treated with the material which waterproofs and reinforces the fiber, although not filling the interfiber spaces completely so as to leave air spaces or voids of from 25 to 50% of the total volume, some of these air spaces being filled with the outer sole material during the injection molding. The insole or slip sole may, for example, be blown cork, sponge plastic, or sponge plastic combined with textile fabric or leather, and may be placed in position within the upper before the outer sole is attached, or it may be inserted after the shoe upper has been fused to the outer sole and midsole. However, it is preferable to install the insole or slip sole at such a time in the operation that it is permanently united to the other parts by the outer sole material. The upper of the boot or shoe may be of plastic-coated fabric, either suede or smooth-surfaced, or having a smooth finish coating, or rubber combined with fabric, or plastic combined with fabric, or single-ply mesh fabrics, or such fabrics combined with other materials, and the invention is applicable also to the manufacture of waterproof storm boots, farm bootees, hunting bootees and so forth, to be worn over the foot or over another shoe. The midsole felt may be of various absorbing material such as sisal, cork or rag stock. As a result of the construction described, the outer sole is waterproof; the shoe is washable and shape-retaining, and is lighter in weight than a shoe having a solid sole of plastic or rubber of the same apparent thickness. The sole is long-wearing and comfortable, providing a certain degree of cushion effect combined with insulation. As already noted, the midsole may be provided with an embedded shank stiffener which may be provided by cutting a suitable slot in the midsole material and filling it with a fluid which, when it sets, becomes hard and stiff, or a pre-fused plastic piece or other shank reinforcement, including steel or the like, may be inserted in the slot. The slot, for the reception of the shank stiffener, may be made at the same time that the midsole is die-cut from the sheet material, and further, at the same time the midsole may be provided with holes for the reception of some of the outer sole material during the injection molding thereby to bond the parts together. The result of the practice of the process disclosed is that all of the parts, with the possible exception of the slip sole, are fused in place by the flow of the outer sole material during injection molding, and the resultant shoe has a semi-rigid midsole which is waterproof and of insulating character and which is firmly bonded to the outer sole by material which forms the outer sole.

While certain desirable embodiments of the invention have herein been disclosed by way of example, it is to be understood that the invention is broadly inclusive of any

We claim:

1. That method of making shoes which comprises as steps: providing an upper, so attaching a lasting cord to the marginal portion of the upper by means of thread loops that the lasting cord contacts the outer surface of the lower margin of the upper above the extreme lower edge of the latter; assembling the upper with a last; pulling the lasting cord thereby drawing the lasting margin of the upper in over and into close contact with the bottom of the last while leaving the entire thickness of the lasting cord exposed at the undersurface of the lasted-in margin; and so attaching an outer sole to said lasted margin that the lasting cord is completely embedded in the substance of the outer sole.

2. The method according to claim 1, which comprises, providing a midsole of fibrous material containing a substance which strengthens and makes the individual constituent fibers waterproof while leaving empty at least 25% of the interstices between the constituent fibers, disposing said midsole in contact with the last bottom before applying pull to the lasting cord, whereby the lasting margin of the upper is drawn inwardly to contact the margin of the midsole, and so arranging the lasted upper and midsole within a mold cavity that the assembled last and midsole constitute a closure for the cavity, and injecting outer sole material in a fluid condition into said mold cavity under pressure whereby, while forming the outer sole, portions of the outer sole material enter the empty interstices between the constituent fibers of the midsole and adhesively bond together the midsole and the inlasted margins of the upper.

3. The method according to claim 2, further characterized in disposing an insole on the last bottom before assembling the upper and midsole with the last so that fluid sole material, passing up through the interstices of the midsole during the molding of the outer sole, provides an adhesive bond for holding the insole in place.

4. The method according to claim 2, which comprises the further step of embedding in the material of the midsole, prior to the assembly of the midsole with the upper and last, an elongate block of a material which is harder and stiffer than that of the midsole proper, thereby to provide the completed shoe with a shank stiffener.

References Cited in the file of this patent

UNITED STATES PATENTS

| | | |
|---|---|---|
| 306,589 | Cross | Oct. 14, 1884 |
| 309,440 | Cross | Dec. 16, 1884 |
| 316,877 | Cross | Apr. 28, 1885 |
| 2,129,106 | Szerenyi et al. | Sept. 6, 1938 |
| 2,301,345 | Tummillo | Nov. 10, 1942 |
| 2,309,775 | Levitt | Feb. 2, 1943 |
| 2,486,995 | Steed | Nov. 1, 1949 |
| 2,651,118 | Root | Sept. 8, 1953 |
| 2,786,237 | Keen et al. | Mar. 26, 1957 |
| 2,789,295 | Rollman et al. | Apr. 23, 1957 |
| 2,799,034 | Crowell et al. | July 16, 1957 |
| 2,815,589 | Sears | Dec. 10, 1957 |
| 2,918,735 | Johnston | Dec. 29, 1959 |
| 2,994,920 | Patera | Aug. 8, 1961 |
| 3,007,209 | Roberts | Nov. 7, 1961 |

FOREIGN PATENTS

| | | |
|---|---|---|
| 524,880 | Italy | Apr. 30, 1955 |
| 1,189,039 | France | Mar. 16, 1959 |